Patented June 4, 1940

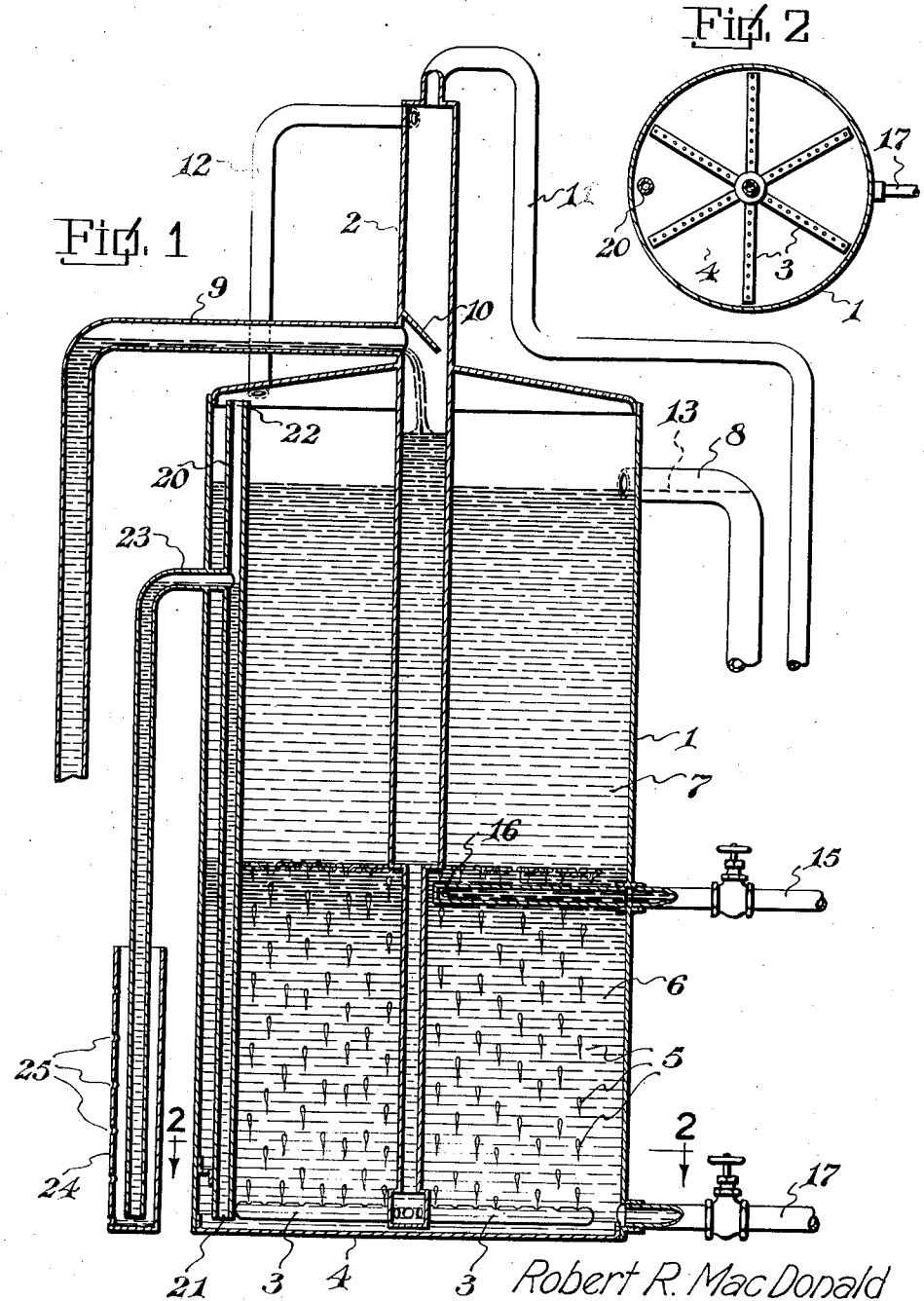

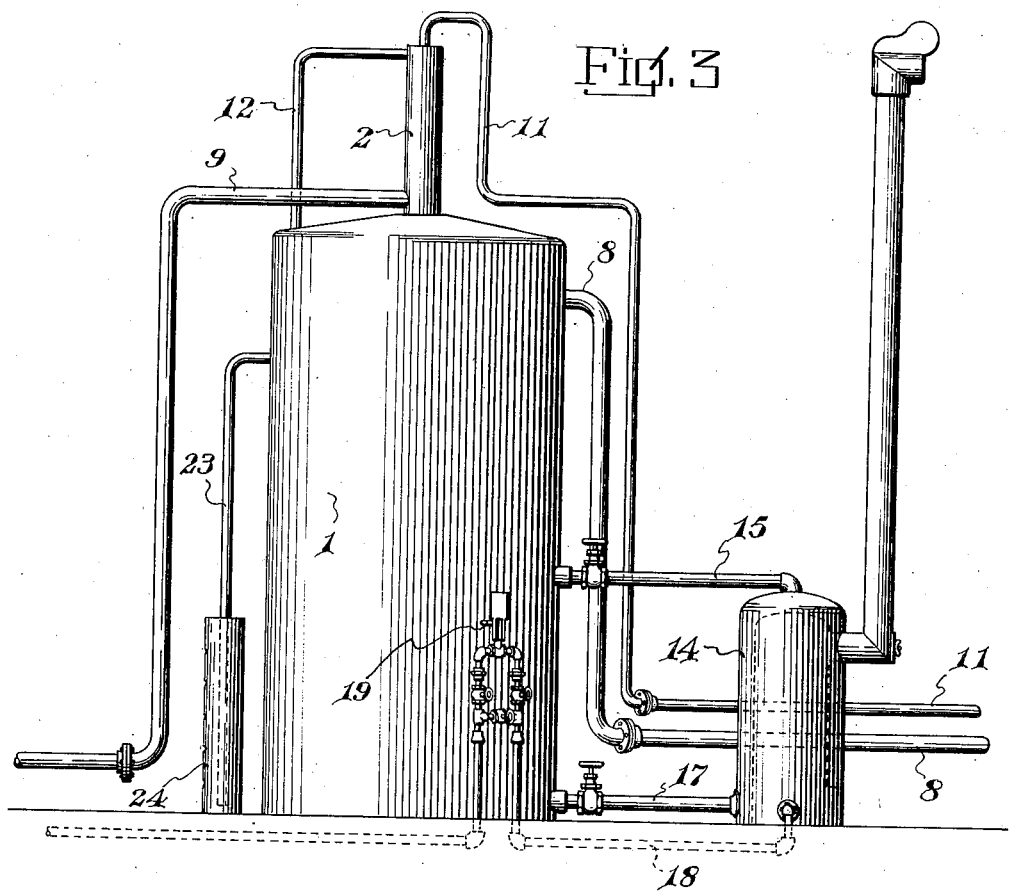
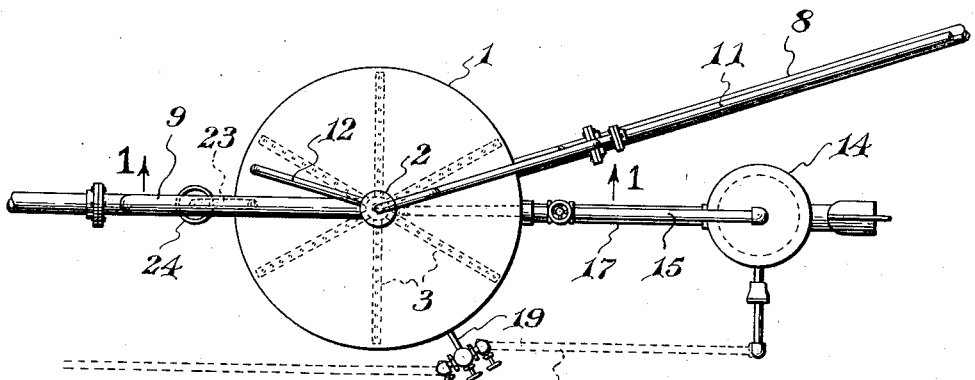

2,203,267

UNITED STATES PATENT OFFICE 2,203,267

OIL TREATING PLANT

Robert R. MacDonald, Cushing, Okla.

Application December 16, 1938, Serial No. 246,243

6 Claims. (Cl. 196—5)

The invention relates to oil treating devices and has for its object to provide a treating device, by means of which the gravity is maintained as high as possible after the treating operation, thereby enhancing the value of the oil.

A further object is to provide an oil treating device wherein the oil is washed at a very low temperature with the minimum amount of agitation, and particularly where the gases are taken off from the device.

A further object is to take off the gas at the coolest point of the device remote in relation to the heating element.

A further object is to provide an oil treating device whereby the oil is washed at a low temperature, is agitated as little as possible and the gases taken off at the coolest point of the device.

A further object is to provide an oil treating device comprising a tank having a separating column, into which oil is discharged from a supply pipe adjacent the upper end of the tank and to provide a perforated spider in the bottom of the tank and through which oil from the separating column is discharged into a heating fluid.

A further object is to provide means whereby water in the lower end of the tank will be circulated from a heating element at a predetermined temperature.

A further object is to discharge the heated water into the tank adjacent the upper end of the body of water for reducing turbulences to a minimum, and to discharge the water from the tank at the lower end thereof.

A further object is to provide means whereby the gases will be taken off from the upper end of the tank through the separating column and at a remote point to the heated water, thereby allowing the recovery of a high grade gas.

A further object is to provide a by-pass pipe connection between the separator column and the upper end of the tank for equalizing the line.

A further object is to provide a pressure cylinder into which the water overflow line extends and discharges and to provide the pressure cylinder with apertures at different elevations which may be selectively plugged for increasing or decreasing the back pressure on the water overflow line for maintaining the levels of fluid within the tank.

With the above and other objects in view the invention resides in the combination and arrangement of parts as hereinafter set forth, shown in the drawings, described and claimed, it being understood that changes in the precise embodiment of the invention may be made within the scope of what is claimed without departing from the spirit of the invention.

In the drawings:

Figure 1 is a vertical longitudinal sectional view through the treating plant.

Figure 2 is a horizontal sectional view through the lower end of the tank taken on line 2—2 of Figure 1.

Figure 3 is a view in elevation of the treating plant.

Figure 4 is a top plan view of the treating plant.

Referring to the drawings, the numeral 1 designates the tank and 2 a separator column extending axially downwardly into the tank and terminating in radial perforated arms 3, adjacent the bottom 4 of the tank. It will be noted that the perforations of the arms are upwardly disposed, therefore globules 5 discharged therefrom will pass upwardly through the body of heated water 6, and will merge into the oil body 7 on the top of the water. The treated oil 7 is discharged at its upper surface through a pipe 8, which leads to a storage tank. Oil in emulsified form is discharged into the upper end of the separating column through a supply pipe 9 and then flows downwardly to the perforated arms 3. The separating column is preferably provided with a baffle plate 10 above the supply pipe 9 for preventing oil from passing upwardly with the gas incident to splashing and the like. The gas in the upper end of the separator column is discharged through the pipe 11 to a storage or gasoline plant for further treatment, if desired.

To take off the gas from the upper end of the tank 1 above the oil level, a by-pass pipe 12 is provided which discharges into the upper end of the separating column. This pipe also forms means for equalizing the pressure. It is understood that gas can not pass through the pipe 8, as the oil level extends into the same, as indicated at 13, therefore the pressure will be substantially the same in the upper end of the tank and in the separating column.

The water is heated by a jacketed heater 14, the upper end of which is provided with a discharge pipe 15, through which the heated water passes, and which discharge pipe extends into the tank 1, adjacent the top of the water level and is provided with an aperture 16 near the center of the tank through which the heated water passes.

As the heat units are reduced in the water, the cold water falls and is discharged from the tank through the discharge pipe 17 to the heater. The water is recirculated. The heater may be of any type, however it is preferably the gas type, and gets its supply of gas through a supply pipe 18 having a thermal control device 19 therein, which extends into the tank 1 and into the body of water, therefore it will be seen that a uniform water temperature may be maintained at all times.

Disposed within the tank 1 and extending through the water and gas bodies is a riser tube 20, the lower end 21 of which is adjacent the bottom 4 of the tank, and the upper end of the tube terminates at 22 in the gas space of the tank above the oil. It will be noted that the water extends upwardly in the riser tube, and it overflows through an overflow line 23, which extends outside the tank and downwardly into a pressure cylinder 24. The pressure cylinder 24 is long and is provided with a series of apertures 25 adapted to be plugged for causing back pressure on the water.

In treating oil to get the highest grade, it is desirable to keep the gravity as high as possible after the oil is treated. In other words, the higher the gravity the greater the value, for instance one degree of gravity lost equals two per cent loss of volume, therefore it will be seen that it is desirable to keep the gravity as high as possible. In the present device, the oil is washed at a very low temperature and agitated as little as possible and the gases are taken off at the coolest part of the device, remote in relation to the heated water body 6. The minimum amount of agitation leaves a maximum amount of the higher volatile elements still mixed with the lower ones, thereby maintaining the highest gravity mass possible. Even with the minimum amount of heat some of the fluid will gasify and return to fluid when it again becomes cool; on the other hand, with too much heat, many of the gases are released which will never become fluid again under normal conditions, therefore it is essential to hold the more volatile elements with the rest of the fluid mass and prevent them from gasifying by using as little heat as is necessary. It will also be seen that by taking the incoming gases away from the unit at its coolest point, which is the top of the separating column, many of the elements will return to a fluid form if not broken up by heat. The oil from the well passes through the supply pipe 9 in an emulsified condition, usually caused by the pump plungers, or other agitation. Gas, water and oil from this mass composed of small globules of water, surrounded by oil and tiny bubbles of gas, surrounded by a thin film of oil are delivered to the device. With this mass pouring into the separating column 2, together with some free gas, the free gas separates and enters the top of the separating column and thence is discharged through the pipe 11. The emulsion is continuously passing downwardly through the column 2.

The emulsion is discharged through the perforated pipes 3 into the bottom portion of the water body 6, which water is preferably heated and maintained at a temperature of one hundred twenty degrees Fahrenheit. As the emulsion emerges from the perforations of the pipes 3, the water which is carried by the oil and bubbles of gas, mixes with the heated water and becomes a part thereof by coalescence, while the oil and bubbles of gas, being lighter than the vehicle, float to the top. The floating action of the globules and bubbles forms an agitation or ebullition and thereby washes the foreign particles from the surfaces of the globules and bubbles. This foreign matter mixes with the water and is eventually carried away with it. The main tank 1 is made large so the settling-out action is slowed. As the globules and bubbles reach the top of the water level they converge and eventually form a part of the solid mass which floats on the water. The water level is constantly maintained at any desired point in the chamber. In the showing in the drawings, it is at the eight foot level. In this case there is maintained an oil column of eight feet on top of the water. This level is accomplished through the medium of the water overflow pipe 23, which permits the overflow at the fourteen foot level. The oil outlet, through pipe 8, is at the sixteen foot level. This arrangement is made possible by the natural law of specific gravity of various elements, that is the difference between the weight of water and the weight of oil of like column. It will be noted that the overflow level of the water through pipe 23 is at a lower level than the top surface of the oil body 7. This is caused by the differentials in weight of fluid. A square inch column of water "salt water" fourteen feet high weighs as much as a square inch column of water eight feet high and a like column of thirty-two gravity oil resting on its top. The above levels will be maintained no matter what proportion of oil against water is used, or vice versa. It will be noted that the oil level in the separating column 2 is higher than that of the main chamber of the tank 1. This emulsion is more oil than water and is therefore lighter than the fluid in the main chamber, which fluid comprises eight feet of water and eight feet of oil. The column of emulsion being lighter, the top level will of course be higher. It will be noted that the equalizing by-pass pipe 12 will not influence the fluid level and will provide equal pressures throughout the gas sections of the device.

The riser tube 20 is open at its upper end so the same pressure will be on the top of the water column therein, that is in the chamber, thereby neutralizing the pressure influenced on both.

It is desirable to carry various levels in the main chamber of the tank and various pressures in the unit. This is partially accomplished by the pressure cylinder 24 into which the lower end of the overflow pipe 23 extends. By closing the bottom hole 25, through which the water was flowing, it must seek a higher level at which to discharge, and by so doing throws a back pressure on the overflow pipe line 23. This can be repeated all the way to the top of the cylinder by merely plugging the holes 25 below the desired level.

The invention having been set forth what is claimed as new and useful is:

1. An oil treating device comprising a tank, a separating column extending downwardly into said tank, the lower end of said column terminating in a discharge head adjacent the lower end of the tank for discharging globules of oil upwardly through a water body, means for discharging emulsified oil into the upper end of the separating column, a discharge pipe at the oil discharge level, means for heating and recirculating the water in the lower end of the tank, a riser tube within the tank and having its upper and lower ends open and extending through the oil and water columns, a water overflow pipe connected to the riser tube and extending outside the tank, a back pressure cylinder, said water overflow pipe extending into the back pressure cylinder and means whereby the water level in the back pressure cylinder may be varied for varying the back pressure on the column of water within the water overflow pipe.

2. An oil treating device comprising a tank having a water column therein with a superimposed oil column, a separating column extending downwardly into the tank and through the oil and water columns, an oil discharging head carried by the lower end of the separating column and adapted to discharge globules into the lower end of the water column, discharge means for gases from the upper end of the tank, means for discharging emulsified oil into the upper end of the separating column for supplying the same to the discharge head, an oil overflow pipe carried by the tank at the oil level, heating means for recirculating the water column and maintaining the same at a low predetermined temperature, said heating means comprising a heating element, a discharge pipe carried by the heating element and extending into the tank adjacent the upper end of the water column and discharging therein, a return pipe connected to the tank and to the heating element and discharging the water from the lower end of the water column and thermostatic control means for controlling the operation of the heating element.

3. A device as set forth in claim 1 including a by-pass pipe connecting the upper end of the tank and the separating column.

4. A device as set forth in claim 2 wherein the upper end of the separating column extends above the tank and a by-pass pipe connects the upper end of the tank with the upper end of the separating column above the tank and above the means for discharging oil into the separating column.

5. A device as set forth in claim 2 including a baffle plate in the separating column above the oil supply pipe and above the tank.

6. A device as set forth in claim 2 wherein the means for maintaining the recirculating water at a predetermined temperature is controlled by the temperature of the water column within the tank.

ROBERT R. MacDONALD.